(12) United States Patent
Wang et al.

(10) Patent No.: US 6,990,681 B2
(45) Date of Patent: Jan. 24, 2006

(54) ENHANCING BROADCAST OF AN EVENT WITH SYNTHETIC SCENE USING A DEPTH MAP

(75) Inventors: Sidney Wang, Pleasanton, CA (US); Richter A. Rafey, Santa Clara, CA (US); Hubert Le Van Gong, Santa Clara, CA (US); Peter Broadwell, Palo Alto, CA (US); Simon Gibbs, San Jose, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 590 days.

(21) Appl. No.: 10/113,707

(22) Filed: Mar. 29, 2002

(65) Prior Publication Data

US 2003/0038892 A1 Feb. 27, 2003

Related U.S. Application Data

(60) Provisional application No. 60/311,513, filed on Aug. 9, 2001.

(51) Int. Cl.
*H04N 7/173* (2006.01)
(52) U.S. Cl. ............ 725/105; 375/240.01; 375/240.25; 375/240.26; 348/157; 348/143; 348/148; 348/155; 348/169
(58) Field of Classification Search ................ 348/157, 348/143, 148, 155, 169, 584; 345/619, 419; 725/105; 375/240.01, 240.25, 240.26
See application file for complete search history.

(56) References Cited

U.S. PATENT DOCUMENTS

| | | | |
|---|---|---|---|
| 4,716,458 A | 12/1987 | Heitzman et al. | |
| 5,600,368 A | 2/1997 | Matthews, III | |
| 5,729,471 A | 3/1998 | Jain et al. | |
| 5,742,521 A | 4/1998 | Ellenby et al. | |
| 5,745,126 A | 4/1998 | Jain et al. | |
| 5,966,132 A | 10/1999 | Kakizawa et al. | |
| 6,031,545 A | 2/2000 | Ellenby et al. | |
| 6,080,063 A * | 6/2000 | Khosla | 463/42 |
| 6,147,716 A * | 11/2000 | Ohki et al. | 348/584 |
| 6,151,009 A * | 11/2000 | Kanade et al. | 345/641 |
| 6,193,610 B1 | 2/2001 | Junkin | |
| 6,359,585 B1 * | 3/2002 | Bechman et al. | 342/359 |
| 6,593,936 B1 * | 7/2003 | Huang et al. | 345/619 |
| 2001/0003715 A1 | 6/2001 | Jutzi et al. | |
| 2002/0069265 A1 | 6/2002 | Bountour et al. | |

* cited by examiner

*Primary Examiner*—Shawn S. An
(74) *Attorney, Agent, or Firm*—Blakely, Sokoloff, Taylor & Zafman LLP

(57) ABSTRACT

A broadcast of an event is enhanced with synthetic scenes generated from audio visual and supplemental data received in the broadcast. A synthetic scene is integrated into the broadcast in accordance with a depth map that contains depth information for the synthetic scene. The supplemental data may be sensing data from various sensors placed at the event, position and orientation data of particular objects at the event, or environmental data on conditions at the event. The supplemental data may also be camera tracking data from a camera that is used to generate a virtual camera and viewpoints for the synthetic scene.

The present invention describes systems, clients, servers, methods, and computer-readable media of varying scope. In addition to the aspects of the present invention described in this summary, further aspects of the invention will become apparent by reference to the drawings and by reading the detailed description that follows.

28 Claims, 14 Drawing Sheets

ENHANCING BROADCAST OF AN EVENT WITH SYNTHETIC SCENE USING A DEPTH MAP

RELATED APPLICATIONS

This application claims the benefit of U.S. Provisional Application No. 60/311,513, filed Aug. 9, 2001, which is hereby incorporated by reference.

This application is related to the pending application, application Ser. No. 09/943,044, filed Aug. 29, 2001, entitled "Enhancing Broadcasts with Synthetic Camera View", which has been assigned to the common assignee of this application.

This application is also related to the pending application, application Ser. No. 09/942,806, entitled "Extracting a Depth Map From Known Camera and Model Tracking Data", filed Aug. 29, 2001, which has been assigned to the common assignee of this application.

FIELD OF THE INVENTION

This invention relates generally to broadcasts of events and in particular to enhancing such broadcasts with synthetic scenes.

BACKGROUND OF THE INVENTION

As broadcast television becomes increasingly sophisticated by augmenting content based on supplemental data sources and camera tracking technology, there is a general desire to open up the possibilities for visual enhancements. Virtual set and movie special effects technology is leading to advanced camera tracking techniques that facilitate the integration of live video into synthetic environments by adapting the synthetic content to camera data (e.g. position, orientation, field of view). Thus the instrumentation of cameras for precise tracking is advancing.

Other technologies such as the new Zcam camera (Zcam is a trademark of 3DV Systems, Ltd.) is beginning to illustrate how depth information can become a first class data source for fusing synthetic content with video. Unfortunately Zcam and other methods of depth extraction (such as image disparity) are currently constrained to a limited volume for acquisition of depth information. The typical acquisition ranges of such technologies vary from a few square meters up to a volume commensurate to that of an indoor studio. The quality of depth reconstruction provided by such systems diminishes as it scales up. Thus these solutions do not scale up to levels where they can be applied to sports venues such as stadiums and racetracks. Modem sports entertainment programming features significant broadcast production enhancements. These enhancements affect both the audio and visual aspects of the coverage. Graphical displays-and audio samples and sound bites are routinely employed to enliven a broadcast's production. However these enhancements generally are not directed by the sports viewer at home.

Traditionally, sport viewers at home rely on the television broadcaster to, provide them with the best coverage available at any given moment. Functioning as a director, the broadcaster will switch from one camera feed to another depending on the events occurring on the field. With the emergence of DTV (digital television) broadcasting, the broadband viewers may have the opportunity to receive multiple camera feeds and be able to navigate amongst them. Still, the coverage of a sporting event is always limited by the fixed number of cameras set up for the event.

The home viewer is not currently able to choose on field activity on which they would like to focus if this activity is not included in the normal broadcast coverage. As there may be event activity occurring outside of the normal broadcast coverage (or that is made possible by multiple camera feeds), on which the home viewer places significant value, traditional broadcast coverage many times proves inadequate.

SUMMARY OF THE INVENTION

A broadcast of an event is enhanced with synthetic scenes generated from audio visual and supplemental data received in the broadcast. A synthetic scene is integrated into the broadcast in accordance with a depth map that contains depth information for the synthetic scene. The supplemental data may be sensing data from various sensors placed at the event, position and orientation data of particular objects at the event, or environmental data on conditions at the event. The supplemental data may also be camera tracking data from a camera that is used to generate a virtual camera and viewpoints for the synthetic scene.

The present invention describes systems, clients, servers, methods, and computer-readable media of varying scope. In addition to the aspects of the present invention described in this summary, further aspects of the invention will become apparent by reference to the drawings and by reading the detailed description that follows.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

DETAILED DESCRIPTION

The following description and drawings are illustrative of the invention and are not to be construed as limiting the invention. Numerous specific details are described to provide a thorough understanding of the present invention. However, in certain instances, well-known or conventional details are not described in order to avoid obscuring the present invention The present invention is described in the context of live sports broadcasts. However, the present invention is not to be limited as such and is applicable to any kind of broadcasted event, live and recorded.

Figure 1:
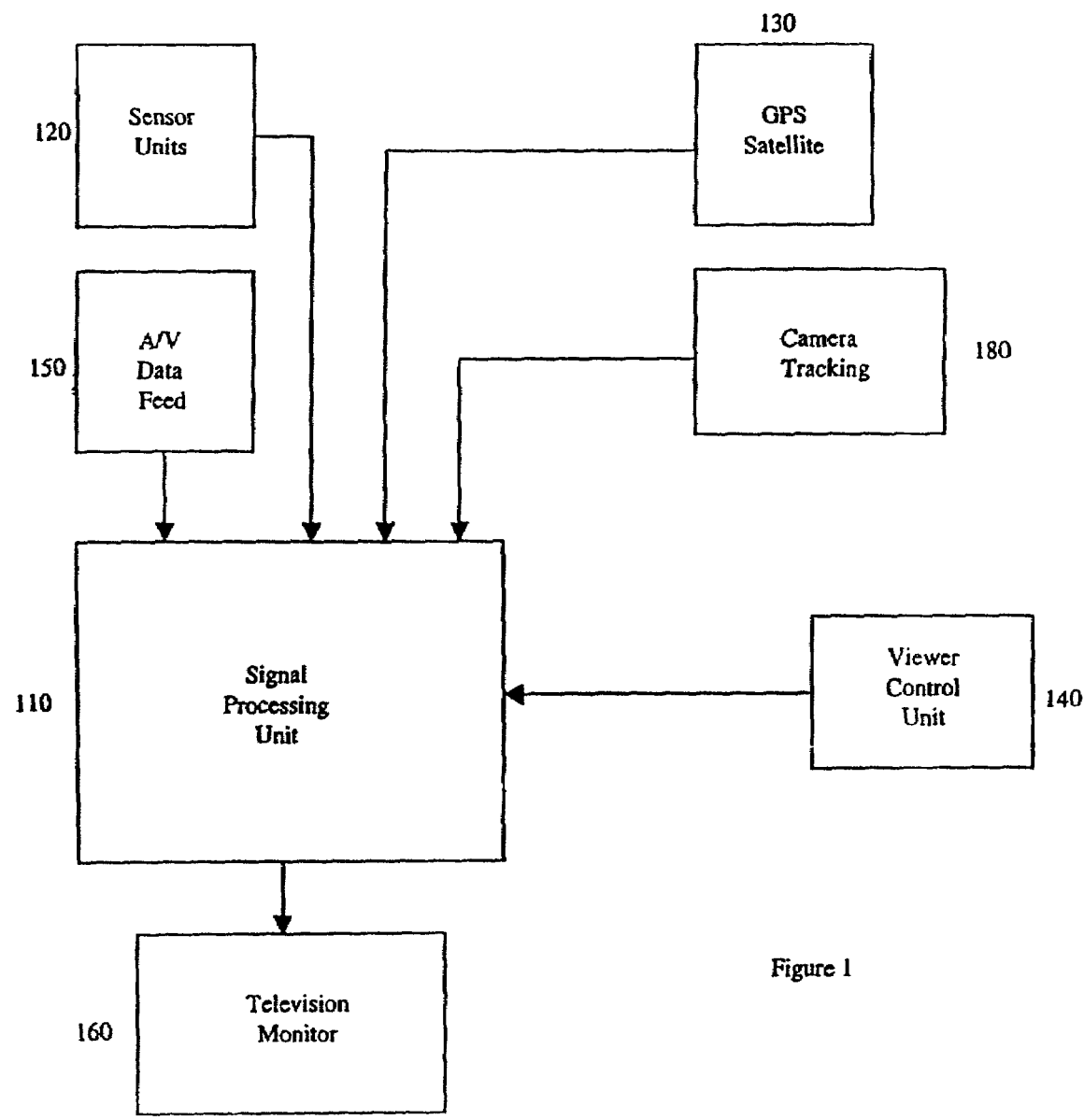
FIG. 1 illustrates one embodiment of an exemplary system in accordance with the present invention.

A system according to the present invention provides for the enhancement of live broadcasting, such as sports broadcasting, with synthetic camera views. A simplified block diagram of one embodiment of an exemplary system is illustrated in FIG. 1. Referring to FIG. 1, the system includes global positioning system (GPS) receiver 130, viewer control unit 140, camera sensor units 120, Audio Visual (A/V) data feed 150, signal processing unit 110, and monitor 160.

Signal processing unit 110 receives data inputs from sensor unit 120, A/V data feed 150, GPS receiver 130, and customer interface 140. The signal processing unit 110 processes these live data streams, along with traditional audio/visual streams, to produce a synthetic camera view enhancement. The synthetic camera shots may be from any desired view positions and angles. The signal processing unit is able to process these various forms of data to present appropriate visual representations on demand. The signal processing unit 110 can be a variety of processing units, including a general purpose processing system. The processed signal on which these synthetic camera shots are based is then fed into the monitor 160 which may be a variety of types of displays including a television or computer system display, for display.

Sensor unit 120 provides sensor data from desired locations. These sensor units are placed in a manner that will facilitate the complimenting of live sport broadcasting with synthetic camera shots from any desired view position and angle. In one embodiment, the sensor data is fed to facilitate the generation of the synthetic views which may be, in one embodiment, realistic computer generated graphics images. The live data streams that are produced by these units are fed into signal processing unit 110.

GPS receiver 130 generates position and orientation data. This data indicates where objects of interest and moving objects, such as particular players or cars, are in 3D space. The live position and orientation data produced by the GPS unit facilitates a greater range of production by providing position and orientation data of objects of interest. This data stream is fed into the signal-processing unit for integration with other live data streams.

Camera tracking unit 180 provides camera tracking data. This data facilitates the integration of live video with synthetic components. The specific data generated may vary according to the equipment used. All or some of the data may be used to integrate video with the synthetic components. The integration is achieved by adapting the synthetic content to the generated camera data. By coordinating or registering the 3D-position information in space with camera tracking information, it is possible to render a virtual version of a known 3D object in a live video broadcast.

The camera tracking equipment, well known in the art, typically uses encoders to read the current pan, tilt and twist of the camera, as well as the zoom level, i.e., the field of view. Furthermore, the position of the camera is tracked in order to reproduce a virtual camera that corresponds to the real camera. The data generated by the camera-tracking unit is fed into the signal-processing unit to be integrated with other live data streams.

In one embodiment an audio visual signal 150 transmitted from A/V data feed is generated by live broadcast camera feeds. The data content of this signal is determined by the broadcaster. This signal is transmitted to the signal-processing unit 110 for integration with the other live data streams.

Viewer 140 determines the live view positions and view angles that may be presented. In one embodiment, viewer input controls the processing of the additional data and determines desired synthetic camera view enhancements that may be presented. In one embodiment viewer control is accomplished using a synthetic camera view creating application as it pertains to the generation of desired view positions and view angles. This application module processes camera view creating instructions that control the integration of the supplemental data streams. In one embodiment, viewer control unit controls the fusing of live video and synthetic camera views. In one embodiment, these camera view enhancements may be viewer controlled or broadcaster controlled but can also have some viewers that aren't based on real cameras but follow a car or a participant.

Viewing monitor 160 presents the live images that are being viewed. These images are based on the signal processed by signal processing unit 110. This signal is transmitted to the television monitor by means of a presentation engine, which resides in the television monitor or in a separate set top box unit, e.g., a game console or another device.

Figure 3:
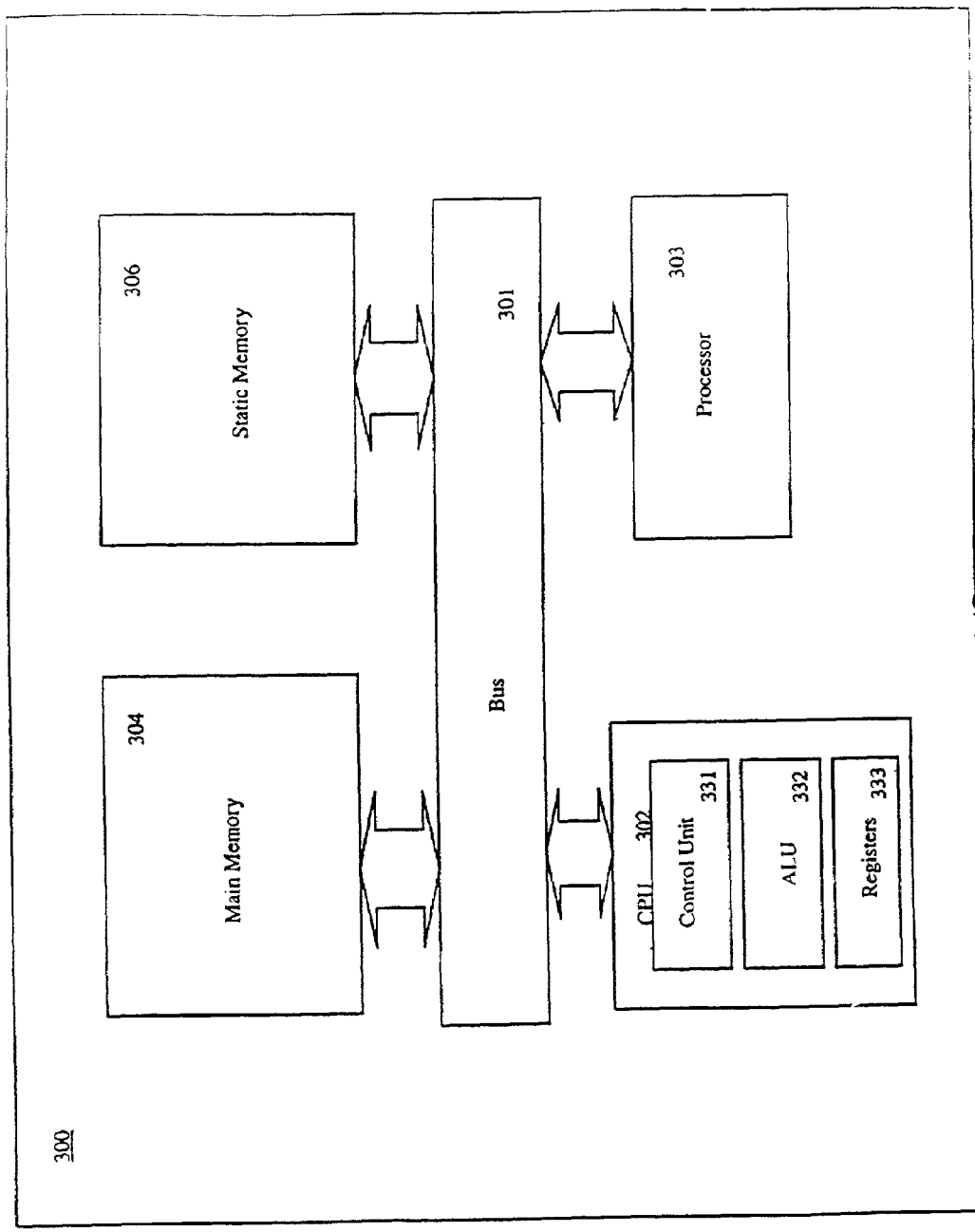
FIG. 3 depicts an exemplary digital video signal processing system in accordance with the present invention.

FIG. 3 depicts an exemplary digital video signal processing system 300 with which the present invention may be implemented. In one embodiment, the synthetic camera view enhancing techniques may be implemented based on a general processing architecture. Referring to FIG. 3, digital processing system 300 includes a bus 301 or other communications means for communicating information, and central processing unit (CPU) 302 coupled with bus 301 for processing information. CPU 302 includes a control unit 331, an arithmetic logic unit (ALU) 332, and several registers 333. For example, registers 333 may include predicate registers, spill and fill registers, loading point registers, integer registers, general registers, and other like registers. CPU 302 can be used to implement the synthetic camera view enhancing instructions described herein. Furthermore, another processor 303 such as, for example, a coprocessor can be coupled to bus 301 for additional processing power and speed.

Digital video signal processing system 300 also includes a main memory 304, which may be a Random Access Memory (RAM) or some other dynamic storage device, that is coupled to bus 301. Main memory 304 may store information and instructions to be executed by CPU 302. Main memory 304 may also store temporary variables or other intermediate information during execution of instructions by CPU 302. Digital processing system 300 may also include a static memory 306 such as, for example, a Read Only Memory (ROM) and/or other static source device that is coupled to bus 301 for storing static information and instructions for CPU 302. A mass storage device 307, which may be a hard or floppy disk drive, can also be coupled to bus 301 for storing information and instructions.

Computer readable instructions may be provided to the processor to direct the processor to execute a series of synthetic camera view-creating instructions that correspond to the generation of a desired synthetic camera view or angle selected by the viewer. A display device, such as a television monitor, display the images based on the synthetic camera views created by the instructions executed by processor 302. The displayed images correspond to the particular sequence of computer readable instructions that coincide with the synthetic view selections indicated by the viewer.

Figure 2:
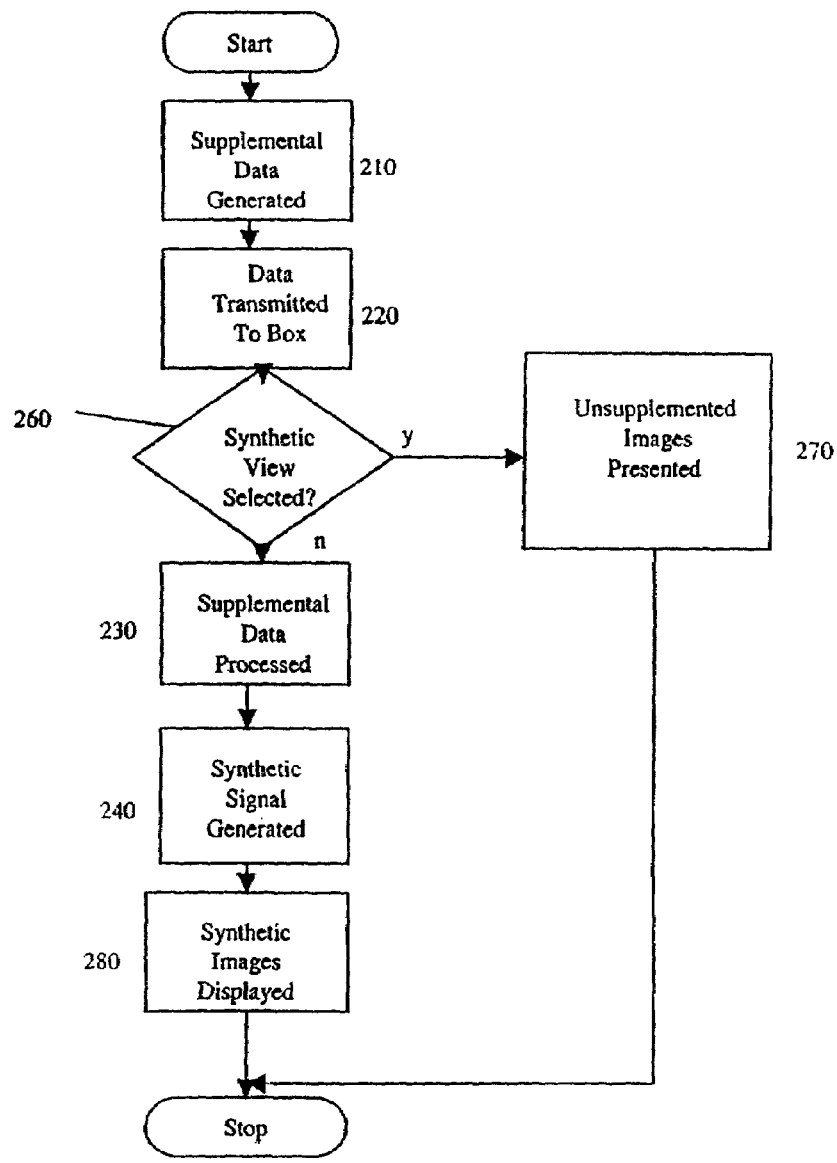
FIG. 2 depicts a flowchart illustrating an exemplary process for enhancing broadcasting of an event in accordance with the present invention.

FIG. 2 depicts a flow chart illustrating an exemplary process 200 for enhancing live sports broadcasting with synthetic camera views. Referring to FIG. 2 at step 210, supplemental live data streams are generated from various sources. In one embodiment, these live data streams are generated by the various sources, such as A/V data feed 150, sensor unit 120, GPS satellite 130, and camera tracking unit 180 of FIG. 1.

At step 220 the live data streams are transmitted to the signal processor. The data received may be used to create synthetic images that are chosen by the viewer. For example, if the sport viewed is car racing, the live video may show a camera view from the driver of one of the cars. A variety of virtual views may be generated; for example, a synthetic or computer generated image of a rear view mirror. One way the car on the track may be generated using the GPS data to determine location and orientation of the car, environmental conditions; e.g., smoke, rain, using the sensor data, and camera tracking data, which enables the computer generated image to be synchronized with the line video such that the computer generated image can be placed within the "rear view mirror" of the car.

At step 230, the supplemental live data streams received in step 220 are processed. In one embodiment, the processing of the transmitted live data is facilitated by a program application in the signal processing unit. The execution of the program may be controlled by the viewer. The viewer directs the system to execute a series of synthetic camera view creating instructions to generate desired synthetic camera views selected by the viewer. In one embodiment a menu may be used; alternately, panning or zooming or positioning a camera in a realistic implementation may be done.

At step 240, a synthetic video signal is generated. This synthetic video signal is based on data components taken from both the normal audio/visual data stream and the supplemented data streams. The synthetic camera views based on this signal are chosen by the broadcast viewer.

The supplemented video signal is then presented to the system presentation engine. This presentation engine may reside in the set receiver or set top box or game console. It can generate the desired synthetic camera view enhancement based on the live supplemental data it received.

At step 280 the television monitor displays the live synthetic camera views that were selected by the broadcast viewer. These camera shots may have been selected from any desired view position or view angle of the on field activities. The capacity to select such views and angles serves to enhance the viewer's awareness of on field actions that are not covered by the live broadcast video feeds.

At step 260, the viewer selects a desired synthetic camera view. This selection determines whether or not the monitor displays images based on the unsupplemented audio/visual signal, or images based on the supplemented video signal.

If the viewer indicates a desire to view a scene not covered in the normal unsupplemented broadcast, then the video signal is processed as described in steps 230 and 240. If the viewer does not desire to select a synthetic camera view, then the unsupplemented normal broadcast signal is presented to the television presentation engine and the normal unsupplemented unenhanced television broadcast is displayed on the television monitor (see step 270).

Figure 4:
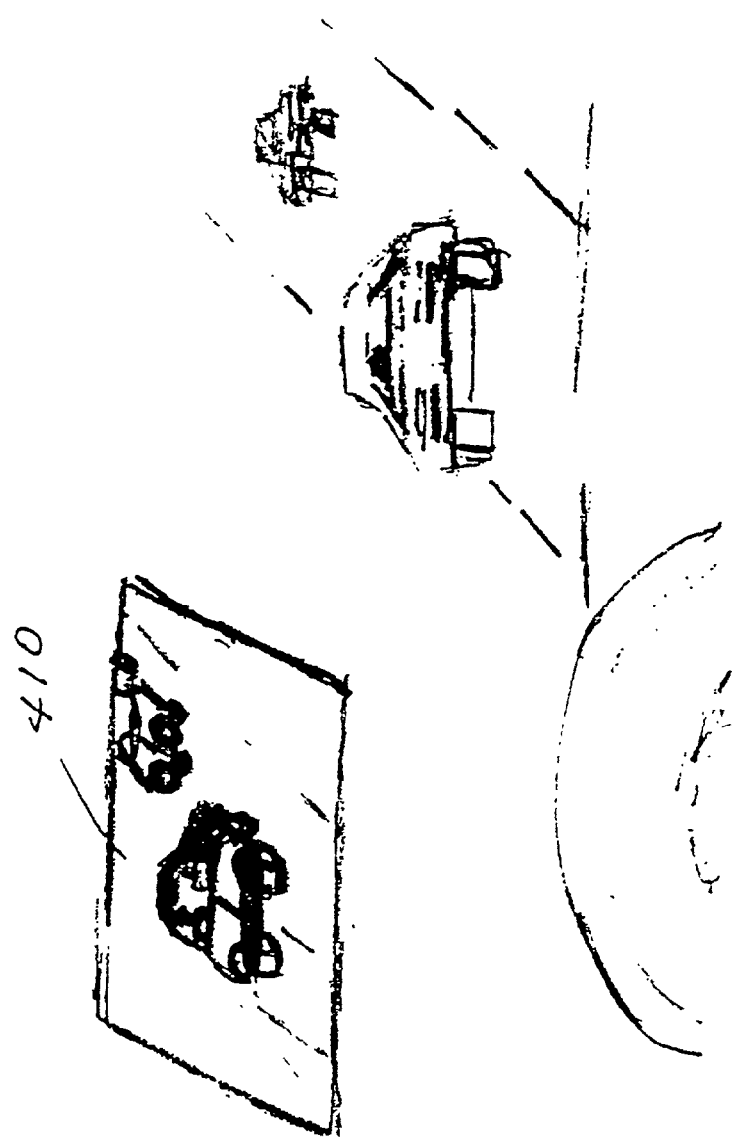
FIG. 4 shows one embodiment of in-car footage provided in accordance with the present invention.

FIG. 4 shows an example of one embodiment of the present invention. Referring to FIG. 4, in motor sports, in-car footage is often shown during broadcast. However, this camera view only provides actions that occur in front of the car. With a synthetic rear-view camera shot mapped into a virtual rear-view mirror 410 or metaphor of the live video footage, viewers can also visualize actions occurring behind the car of interest.

Figure 5:
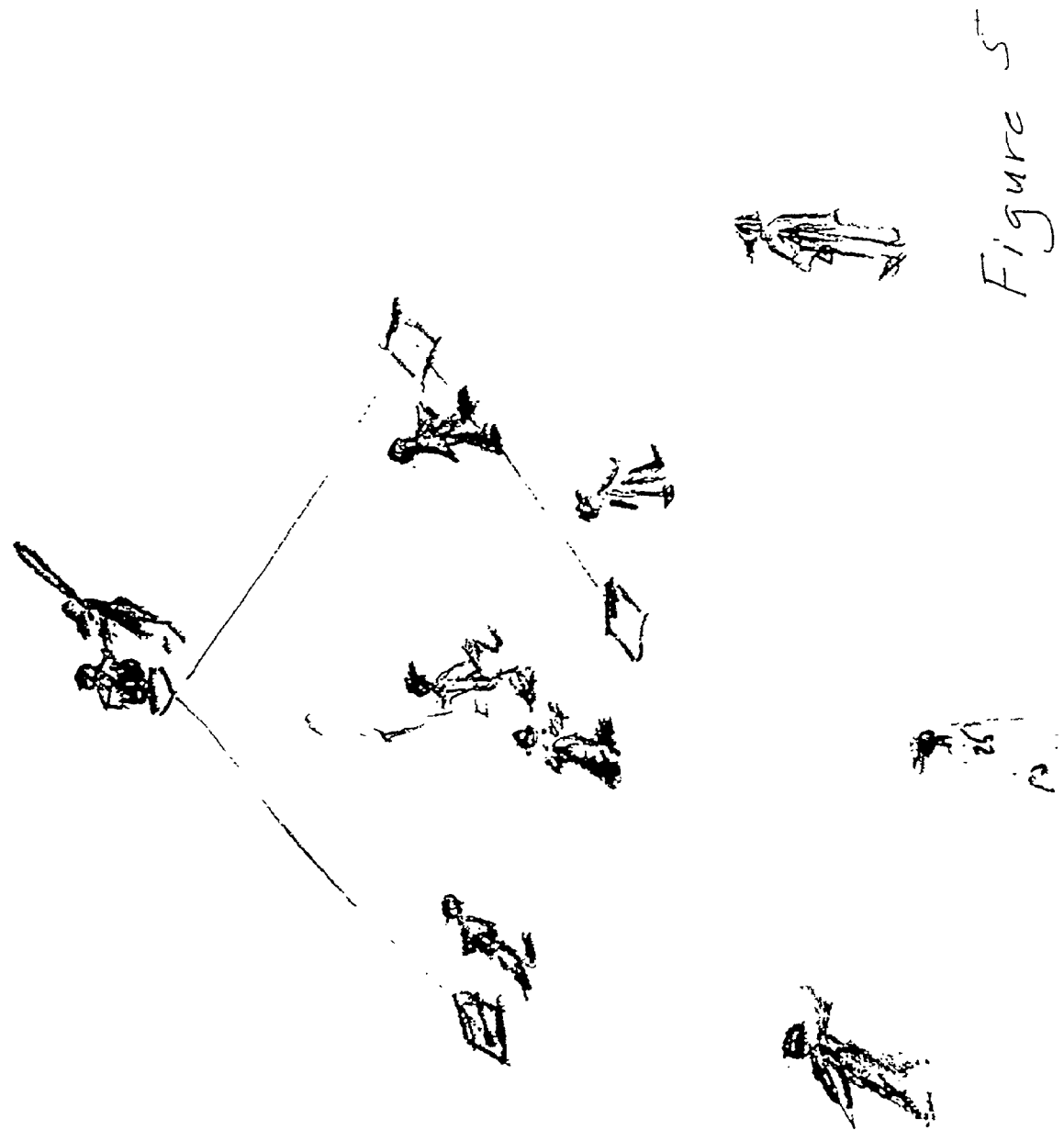
FIG. 5 illustrates a synthetic view selection provided in accordance with one embodiment of the present invention.

FIG. 5 shows another example of one embodiment of the present invention. Referring to FIG. 5, some telecast sports are showing actions seen from the perspective of players or umpires on the field. However, it is usually not possible for the viewers at home to receive all the A/V streams from all players. Thus, viewers are not able to freely choose the inplayer camera view from the player of their choice. The process, according to one embodiment of the present invention, can generate synthetic camera views from any position and angle. In this way, inplayer views from any player can be produced. In FIG. 5, inplayer views may be produced from the perspective of any of the player shown.

Figure 6:
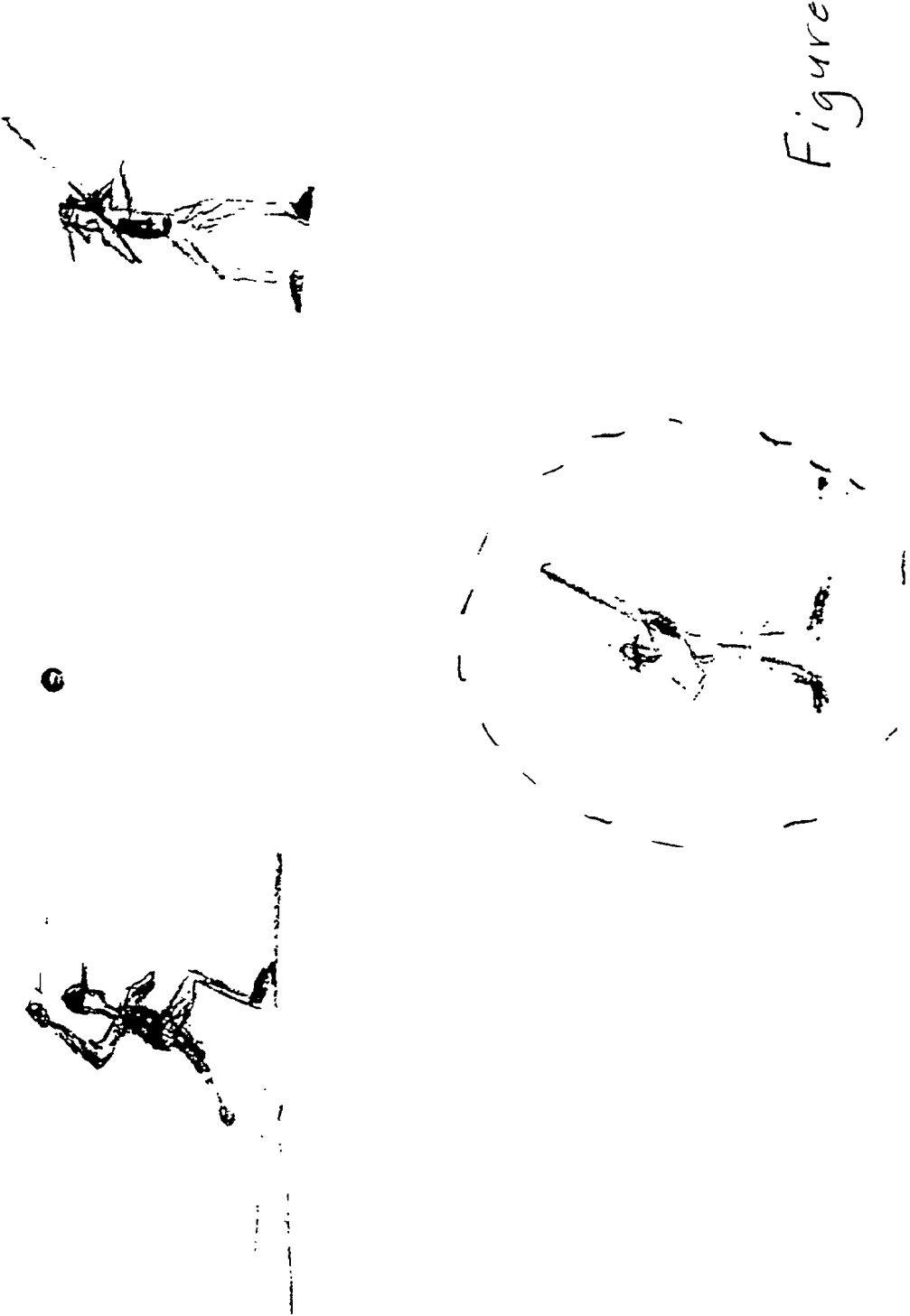
FIG. 6 illustrates a synthetic view selection provided in accordance with one embodiment of the present invention.

FIG. 6 shows another example of one embodiment of the present invention. Referring to FIG. 6, similar to the inplayer view, one can create synthetic camera views from the viewpoint of a baseball, football, etc. The views obtained by such camera shots give viewers a new perspective when watching a sporting event.

Figure 7:
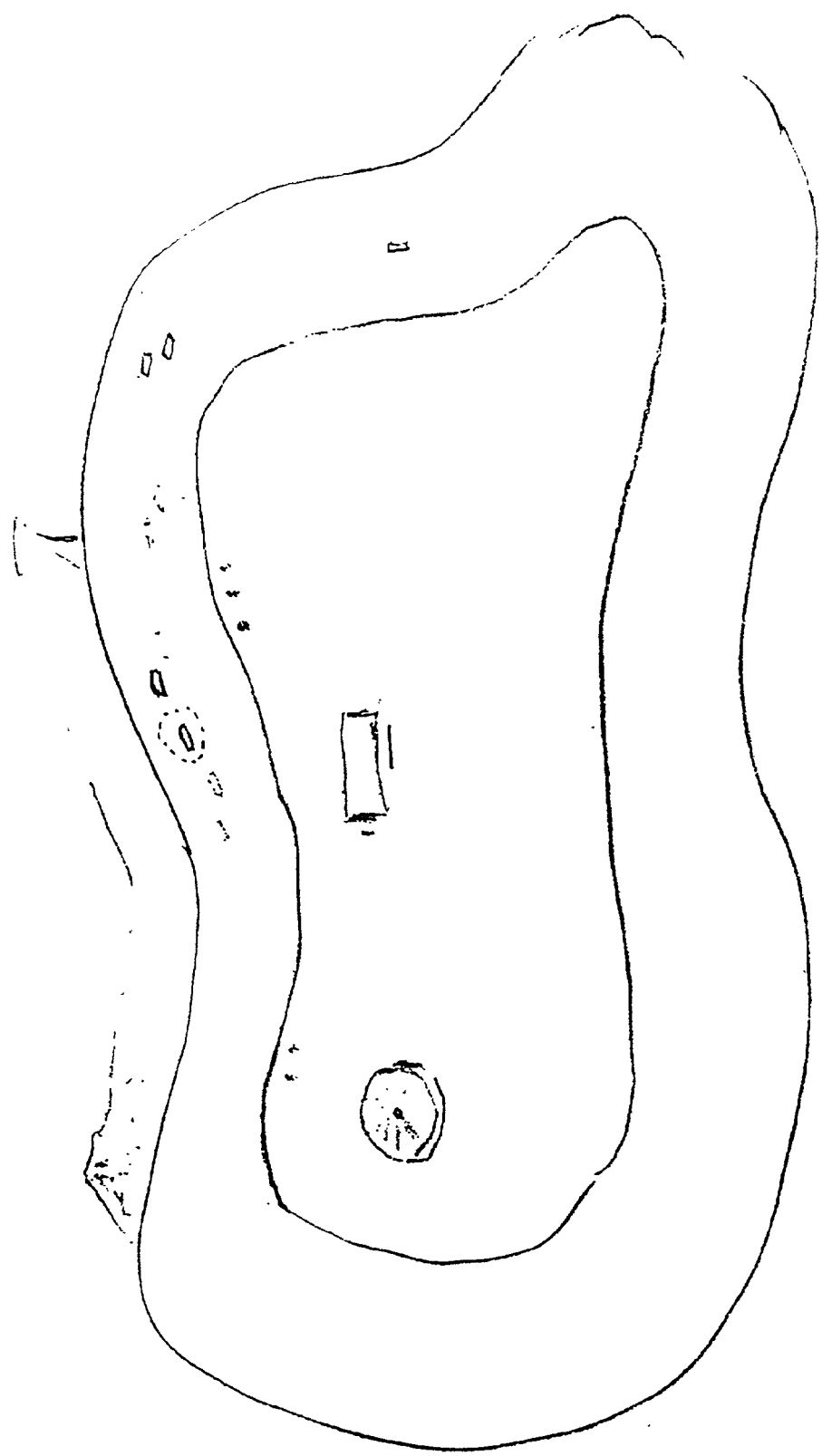
FIG. 7 illustrates a synthetic view selection provided in accordance with one embodiment of the present invention.

FIG. 7 shows one embodiment of the present invention. In motor sport, a motor sport fanatic might want to follow his favorite driver throughout the race. However, most likely this driver will not be covered by the live broadcast for the entire race duration. Upon a viewer's request, the system according to one embodiment of the present invention may display a synthetic camera rendering that focus on a desired driver at all times.

The solution requires sensor data to be broadcast along with the traditional A/V streams. At a minimum, the sensor data should contain the position data for the critical elements (e.g. players, cars) in the sporting events. To achieve more realistic synthetic camera shots, a higher degree of sensor data tracking the orientation of the car, the movement of player's arms and legs and environmental conditions are needed.

Figure 8:
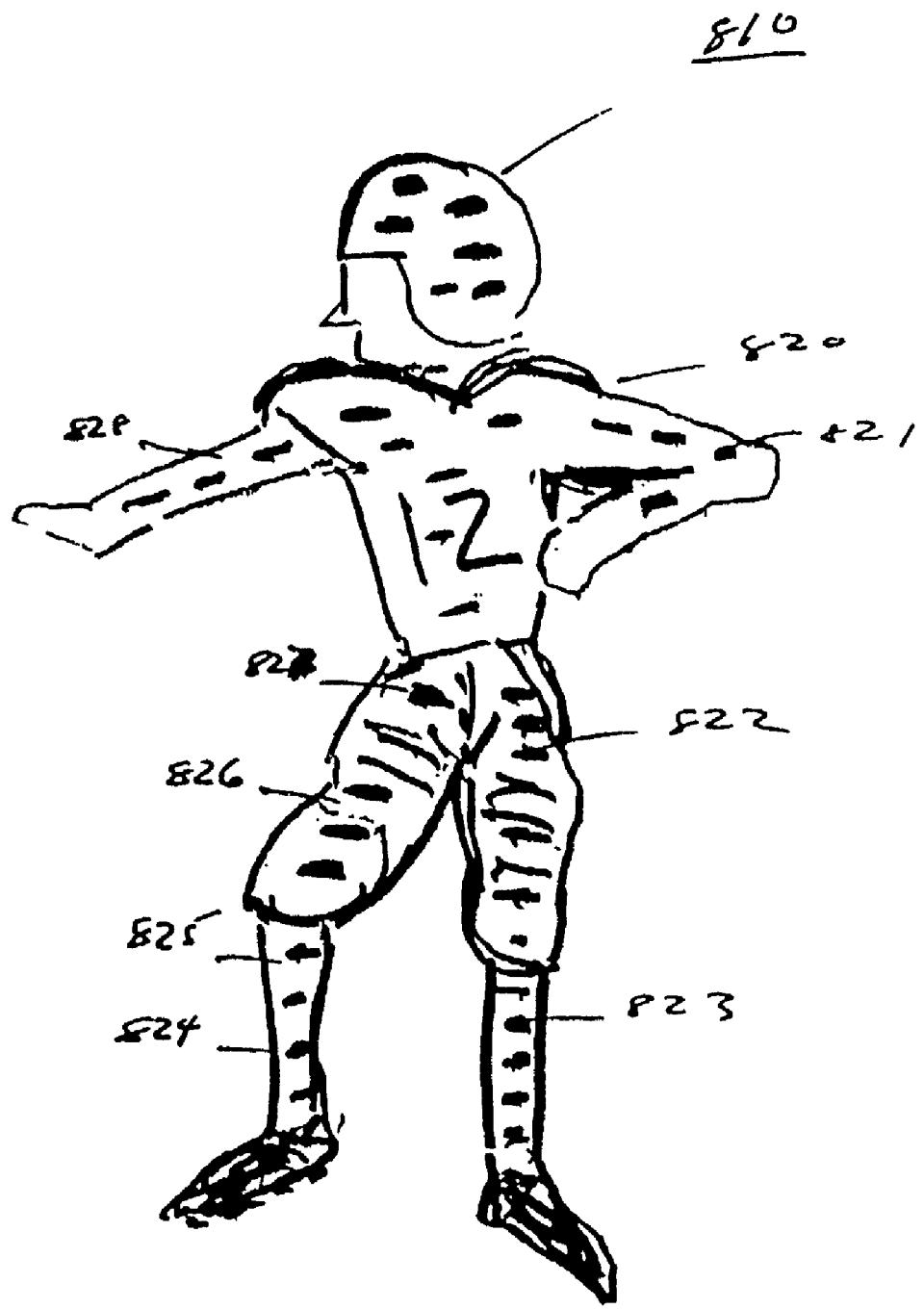
FIG. 8 illustrates an example of sensor placement provided in accordance with one embodiment of the present invention.

FIG. 8 shows an example of sensor placement. In FIG. 8, a football player 810 is shown in a typical football stance. Sensors 820 through 828 are placed at strategic points on the player's body. The sensors placed on the player's arms and legs provide a high degree of sensor data. This sensor data facilitates the achievement of more realistic synthetic camera shots such as the movement of the player's arms and legs.

As discussed above the following description, for purposes of explanation, numerous details are set forth in order to provide an understanding of the present invention. However, it will be apparent to one skilled in the art that these specific details are not required to practice the present invention. The invention is described in the context of integrating a synthetically generated object, for example, a race car or football player, into a live video environment, for example, a car race or football game. It is readily apparent that the present invention is not limited to live video as the invention is readily applicable to any imaging media and media signals. Furthermore, the present invention is applicable to a wide variety of venues including sporting events.

Figure 9:
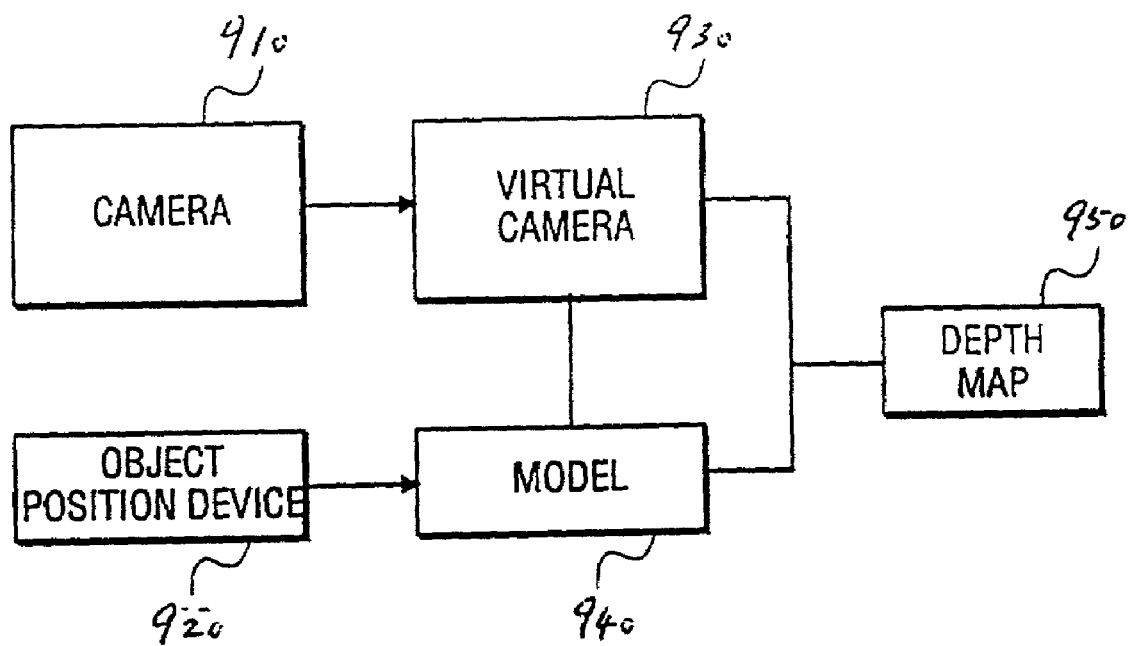
FIG. 9 is a simplified block diagram of one embodiment of the system of the present invention.

Another embodiment of the system is illustrated by the simplified block diagram of FIG. 9. A first camera 910 is used to supply camera data for the virtual camera 930, for example, information to define a viewpoint for the synthetic scene. The field of view of the camera 910 is also used to define the field of view for the virtual camera 930. A tracked object's position, for example, the position of a race car of interest, is determined by object position device 920. In one embodiment, the position is determined using a Global Positioning System (GPS) receiver. Other position determining devices may also be used. The position of the tracked object is used to position a model, for example, a computer generated model 940 and from this information a depth map 950 can be generated.

Figure 10:
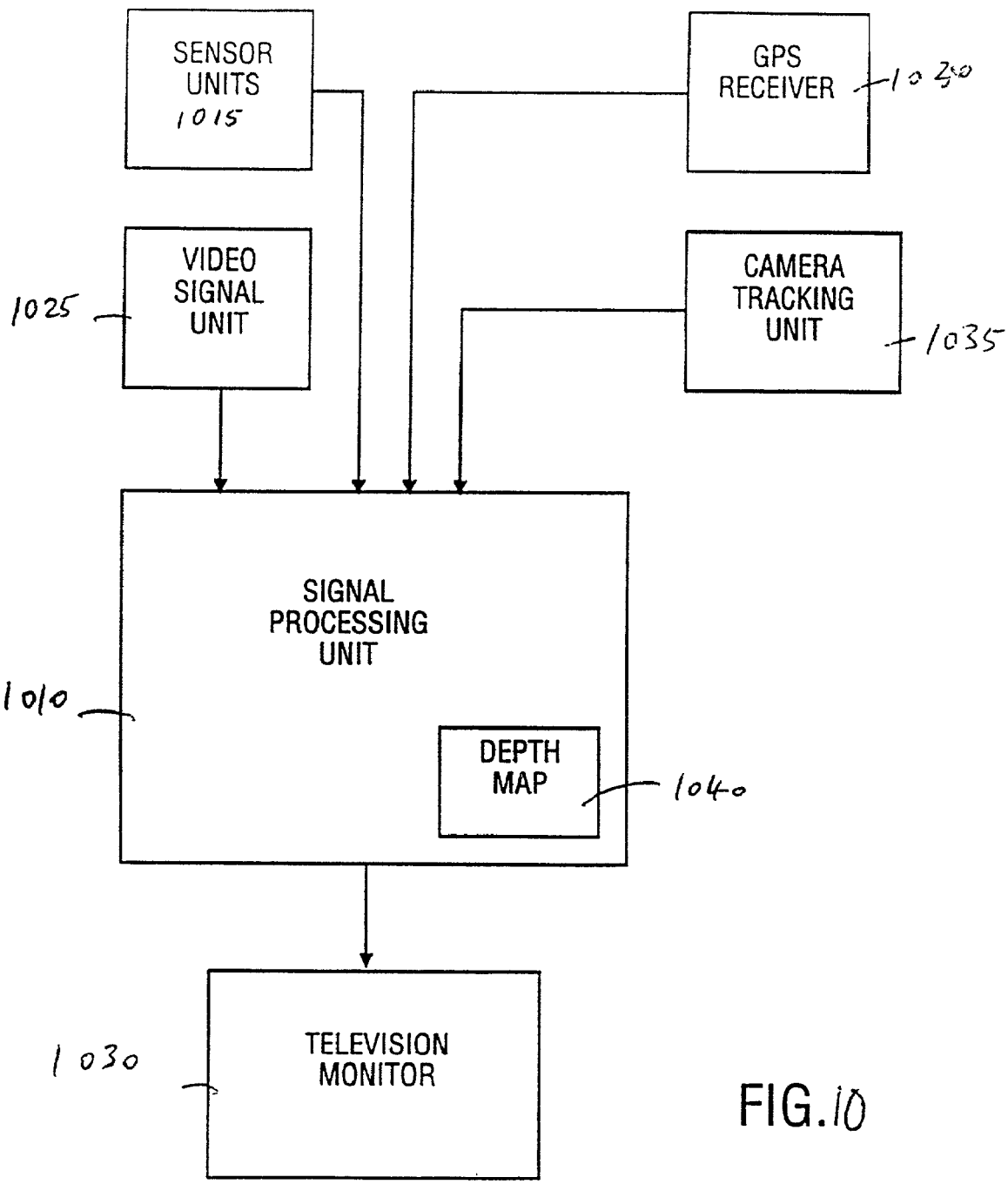
FIG. 10 shows a simplified diagram of one embodiment of the system architecture of the present invention.

The system and method of the present invention provides for the extracting of a depth map from camera and model tracking data. Embodiments of the system and method of the present invention further provide for rendering a model in a live image environment using the depth map. A simplified block diagram of one embodiment of an exemplary system is illustrated in FIG. 10. Referring to FIG. 10, the system includes, global positioning system (GPS) receiver 1020, camera tracking unit 1035, sensor unit 1015, video signal unit 1025, signal processing unit 1010 and television monitor 1030.

Signal processing unit 1010 receives data inputs from sensor units 1020, video signal unit 1025, GPS receiver 1020, and camera tracking unit 1035. More particularly, the signal processing unit 1010 receives sensor data from sensor units 1020, position and orientation data from GPS receiver 1020, video data from video signal unit 1025 and camera data from camera tracking unit 1035. As discussed below, the signal processing unit 1010 processes these live data streams, to produce at least one synthetic camera view.

The synthetic camera views utilize depth maps 1040, which, in one embodiment, have been extracted using the camera data and model data. The processed video signal from which these synthetic camera views are based may then be fed into a monitor, such as a computer monitor or television monitor 1030 for display.

Sensor unit 1015 provides sensor data from desired view positions and angles. These sensor units are placed in a manner that will facilitate the complimenting of live sports broadcasting with synthetic camera shots from any desired view position and view angle. In one embodiment, the sensor data is used to facilitate the generation of the synthetic views which may be, in one embodiment, realistic computer generated graphics images. Examples of sensor data include position of limbs of a player, weather and/or lighting conditions, and the like.

GPS receiver 1020 generates position and orientation data for each object having a co-located GPS receiver 1020. This data indicates where particular objects, such as players or cars, having a co-located receiver, are in space by providing position and orientation data of objects of interest.

Camera tracking unit 1035 provides camera-tracking data. This data facilitates the integration of synthetic environments into video by using camera data to adapt the synthetic content to the camera data reflective of the video environment. By registering position information, for example, 3D-position information, of the synthetic environments in space with the camera data, it is possible to render a virtual version of a known object. The camera tracking equipment that provides the camera data is known in the art and typically uses encoders to read the current pan, tilt, and twist of the camera, as well as, the zoom level, i.e., the field of view. Furthermore, the position of the camera is tracked, for example, by a GPS unit. As explained below, the camera data is used to reproduce a virtual camera that corresponds to the real camera.

The audio-visual signal from video signal unit 1025 is generated by the live broadcast. The data content is determined by the broadcaster. This signal is transmitted to the signal-processing unit 1010 for integration with the other live data streams mentioned earlier.

By registering the position information in space of an object with camera data, it is possible to render a virtual version of a known object (e.g., a race car) properly placed, scaled and oriented in front of a video scene, thereby integrating synthetic content with video content.

The processes described herein may be implemented as computer readable instructions which are provided to a processor such as the processing system 300. These instructions are stored on and transferred over a computer readable medium and direct the processor to implement a series of commands that correspond to the processes herein described.

In one embodiment of the present invention, the position and orientation information used in conjunction with camera tracking data produces a virtual object. This virtual object is rendered to a depth map. The depth map captures the relative distance of the virtual objects from the view of a particular camera. In one embodiment of the system of the present invention, it is derived by reconstructing a virtual view with known 3D models and position and camera tracking data. Camera tracking data provides enough data to precisely emulate the real camera view in a virtual rendering.

Figure 11A:
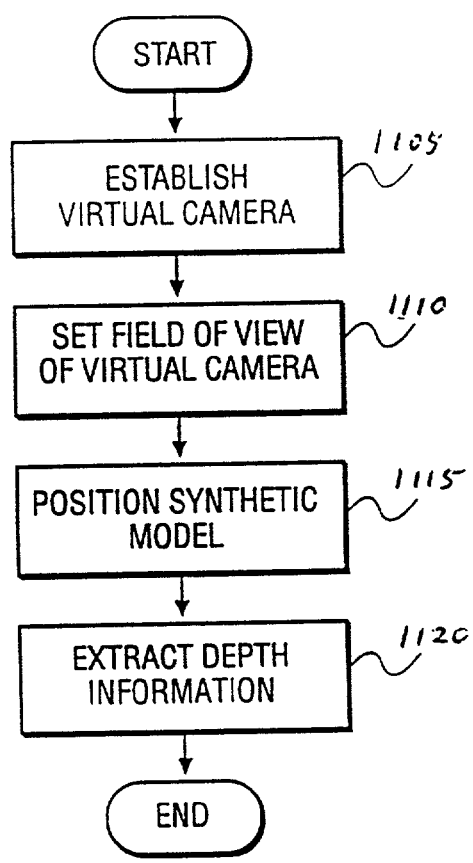
FIGS. 11a and 11b illustrate embodiments of processes of the present invention.

One embodiment of the process is illustrated by the simplified flow diagram of FIG. 11a. At step 1105 a virtual camera is established. In one embodiment, camera data from a camera filming (referred to herein as a live camera), for example a camera filming an auto race, consisting typically of position and orientation information, is used to establish the position, orientation etc. of the virtual camera. Thus the live camera data defines a viewpoint for the camera in the synthetic scene. In one embodiment, the motion of the camera may then be used to drive the motion of the virtual camera.

At step 1110, the field of view of the virtual camera is set to that of the live camera and at step 1115 the synthetic model is positioned. In one embodiment, the model is a three dimensional graphic generated representation of an object, such as racing car, using the example discussed herein. The model is positioned in the synthetic environment in accordance with the virtual camera. At step 1120, the depth map can be extracted from the synthetic environment and used for a variety of purposes, including combining the synthetically generated object(s) with the live imaging (i.e., video).

Figure 11B:
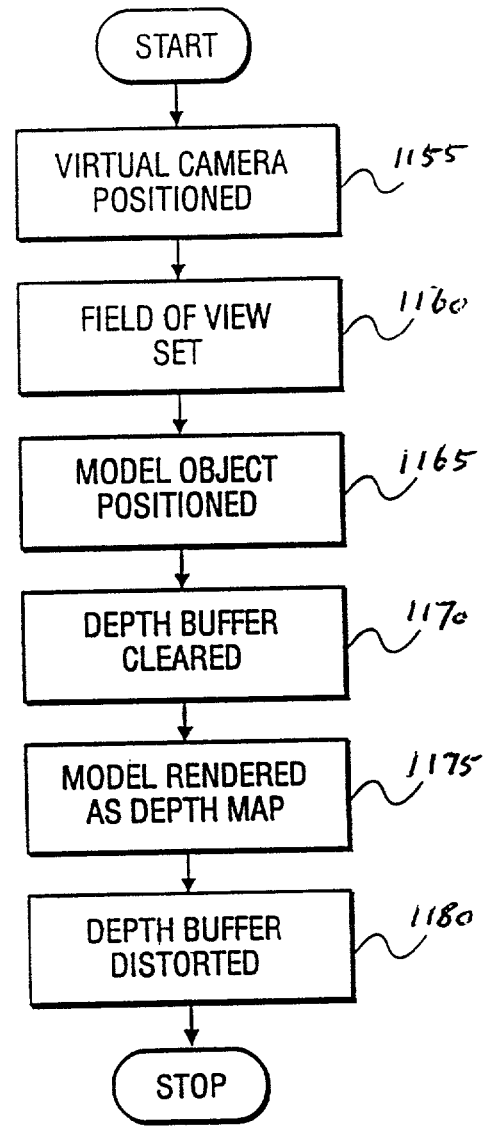

FIG. 11b illustrates an exemplary process of one embodiment of the present invention. Referring to FIG. 11b, at step 1155 the virtual camera is positioned at the coordinates/orientation of the tracked camera. This information imparts to the virtual view an orientation that is analogous to that of the view generated by the tracked camera. The virtual camera coordinates/orientation thus obtained are used to assess the objects from the view of the virtual camera.

At step 1160, the field of view of the virtual camera is set to the field of view of the tracked camera. This step gives the virtual camera a field of view analogous to that of the tracked camera.

At step 1165, the position and orientation of the virtual model is positioned to the coordinates and orientation of the tracked object. This step gives the virtual model a position and orientation analogous to that of the tracked object.

At step 1170 the depth buffer is cleared. This frees the depth buffer so that the model of the tracked object may be loaded into the buffer. In one embodiment, the depth buffer is cleared for each frame of live video subsequently combined with the synthetically generated data.

In step 1175 the model of the tracked object is rendered to the depth buffer. This model is rendered to the depth buffer as a depth map. The reconstructed data upon which this depth map is based allows the capturing of the relative distances of objects from the view of a particular camera.

At step 1180 the data in the depth buffer is distorted. In one embodiment, this is accomplished by copying the contents of the depth buffer to a texture on a grid, distorting the grid coordinates, and rendering the grid to generate the depth buffer. The depth buffer is then distorted using the radial distortion coefficient/optical center shift of the tracked camera, thereby completing the process.

Since the images generated are a virtual reconstruction, the resolution of the images are arbitrary and not constrained by video resolution, but in practice, since it is ultimately fused with video data, it will typically be processed at video resolution. The depth map can be used to compute occlusion with a graphic system using techniques known in the art, but in large-scale venues. Computing the depth information can be done in real time, as it is simpler than traditional rendering, because lighting and other visual enhancements are not required to produce a depth map.

For example, processes executed in accordance with one embodiment of the invention may be used to create a depth map for an auto racing broadcast. The depth map generated can facilitate the insertion of graphics objects into video images with proper occlusion so that the inserted graphics seamlessly integrate in with the video images displayed in the racing broadcast. For instance, to show a viewer controlled virtual car racing against the live racers on a networked home game console or in a sports bar. The viewer would be able to observe their performance as if they were in the live race. An example of one embodiment is explained below in the context of an auto racing broadcast that is enhanced by the integration of virtual car images using the process.

The virtual camera is positioned at coordinates/orientation of a tracked camera. Some cameras on the market today are instrumented to enable real-time tracking of their position and orientation. This camera data can serve as a feed for data packets to the device that is doing the graphics generation of synthetic environments. The device doing the graphics generation begins with a geographically registered 3D model of the same track ("virtual track") where the race is taking place. The live camera data defines a viewpoint for the camera in the synthetic scene. This enables the motion of the camera at the race to drive the motion of the camera that is used to render the virtual track.

The field of view is set to that of the tracked camera. Among other camera parameters in the data packet, the virtual camera replicates the field of view so that the viewing frustum for the virtual scene maps precisely to that of the live camera. This enables the edges of the rendered scene to correspond to the edges of the video from the tracked camera.

The position/orientation of the model of the tracked object is positioned/oriented to coordinates/orientation of the tracked object. For example, using GPS (Global Positioning System) sensors on each car in the race, a 3D model of the associated car is placed in the scene and animated based on the derived sensor data. The derived sensor data is transmitted in data packet form. Orientation may also be based on the track model if the GPS data doesn't provide sufficient data using the geometric normal of the part of the track model where the car is located. This may be accomplished because the track model has a fixed inclination. Additionally, steering wheel data may be used to properly orient the tires to the rest of the car because the tires rotate based on steering.

Ultimately the virtual scene is rendered into a depth buffer that will have a numeric value for every pixel reflecting normalized depth information relative to the camera being used to render the scene (that being tracked). In one embodiment, to support dynamic depth tracking, the depth buffer is initialized as empty for each frame that is rendered.

The model of tracked object is rendered as a depth map into depth buffer. The synthetic content (car model and track model) may be rendered into a depth map that rather than being a visually accurate image of the track is just the normalized depth value for each pixel of the image. This may be used as an auxiliary data source for subsequent composting of video graphics content. Alternatively, only the tracked objects may be rendered, but there are situations where it might be appropriate to occlude all or part of a car based on fixed objects (e.g., going under a sign or bridge). In such situations the occluding features (e.g., signs, bridges) that are rendered into the depth map with the tracked objects (vs. the track and other rigid features in the 3D model).

The depth buffer may be distorted (e.g., conceptually copy to a texture on a grid, distort grid coordinates, render grid) using radial distortion coefficient/optical center shift of the tracked camera. A final step in refining the depth buffer is distorting the image to adjust to some of the characteristics of the tracked camera to compensate for real distortion. In one embodiment, this is basically an image warp similar to a pincushion pattern. In alternative embodiments either the depth map or the video image, may be distorted depending on subsequent usage needs. As long as the models and data are highly accurate, there should be very accurate pixel coverage and it would be possible to overlay the graphics directly on the video and have them registered. The normalized depth data has a mapping to 3D space so that it can be properly registered with the video and only the parts of graphics objects that should not be occluded by objects in the video will be overlaid in the final composition. This happens by associating the depth map and the video imagery together, then inserting any additional features using the depth information to determine which parts are visible.

In practice, there may be artifacts based on the precision of the data or of the models used in the rendering. One potential solution for removing the artifacts to make the integration of synthetic and video content more seamless would be to combine data from the depth map with a video processing routine that does real time image segmentation.

In one embodiment of the present invention, the process involves duplicating the distortion introduced by the video camera's optics. Camera tracking data which supports this system functionality includes pan/tilt/roll, nodal point position (in 3D space), field of view, optical center (in the image plane), and radial distortion coefficient.

Figure 12:
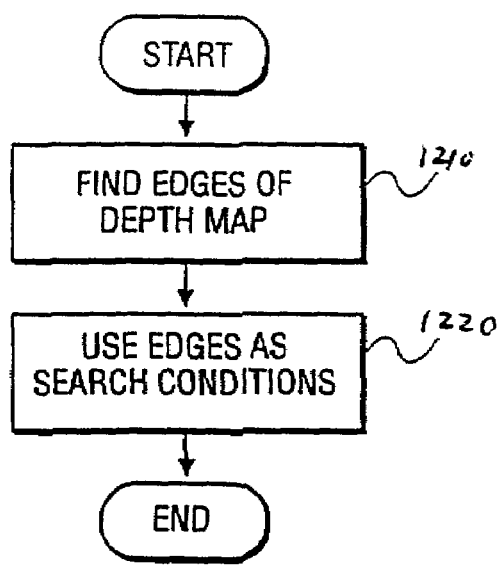
FIG. 12 illustrates an exemplary embodiment of a process which may be used in conjunction with the present invention.

FIG. 12 shows one embodiment of a process that may be used in conjunction with the present invention. Referring to FIG. 12, at step 1210 the edges in the depth map are found, for example, by using a LaPlacian filter or by rendering the silhouettes of the models into a third destination.

At step 1220, the edges found in step 1210 are used as initial conditions for a search in the video image data for edges, because the interest is only in the segmentations that are near these edges. When processing the video data as illustrated in steps 1210 and 1220, a variety of edge detection processes will work.

Figure 13:
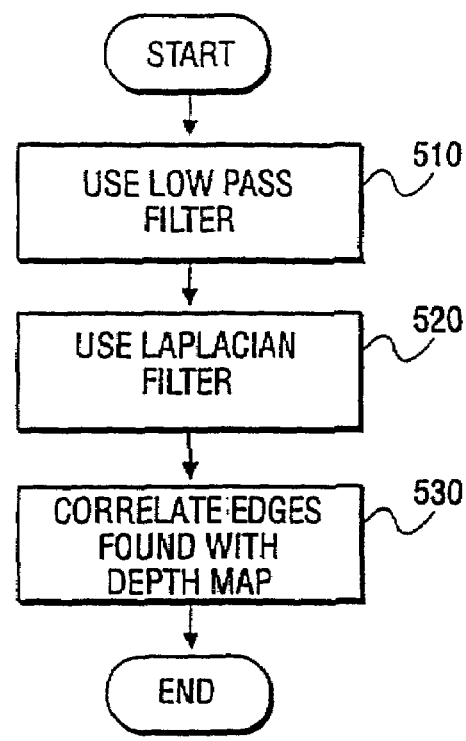
FIG. 13 illustrates an exemplary embodiment of a process which may be used in conjunction with the present invention.

FIG. 13 shows an exemplary process to be used in conjunction with the present invention. Referring to FIG. 13, at step 510, a low-pass filter is used. Such a filter is utilized since the interest is not in high-frequency changes. It is the appropriate filter type because the search is for larger objects. It is readily apparent that other types of filters may also be used.

At step 520, a LaPlacian operation is used to find edges. This is accomplished by only calculating in the vicinity of edges known to be in the depth map. It is readily apparent that other processes may be used to identify edges.

At step 530, found edges are correlated with the edges of the depth map. By correlating the depth map appropriately, there should be produced a much more useful depth image.

Figure 14:
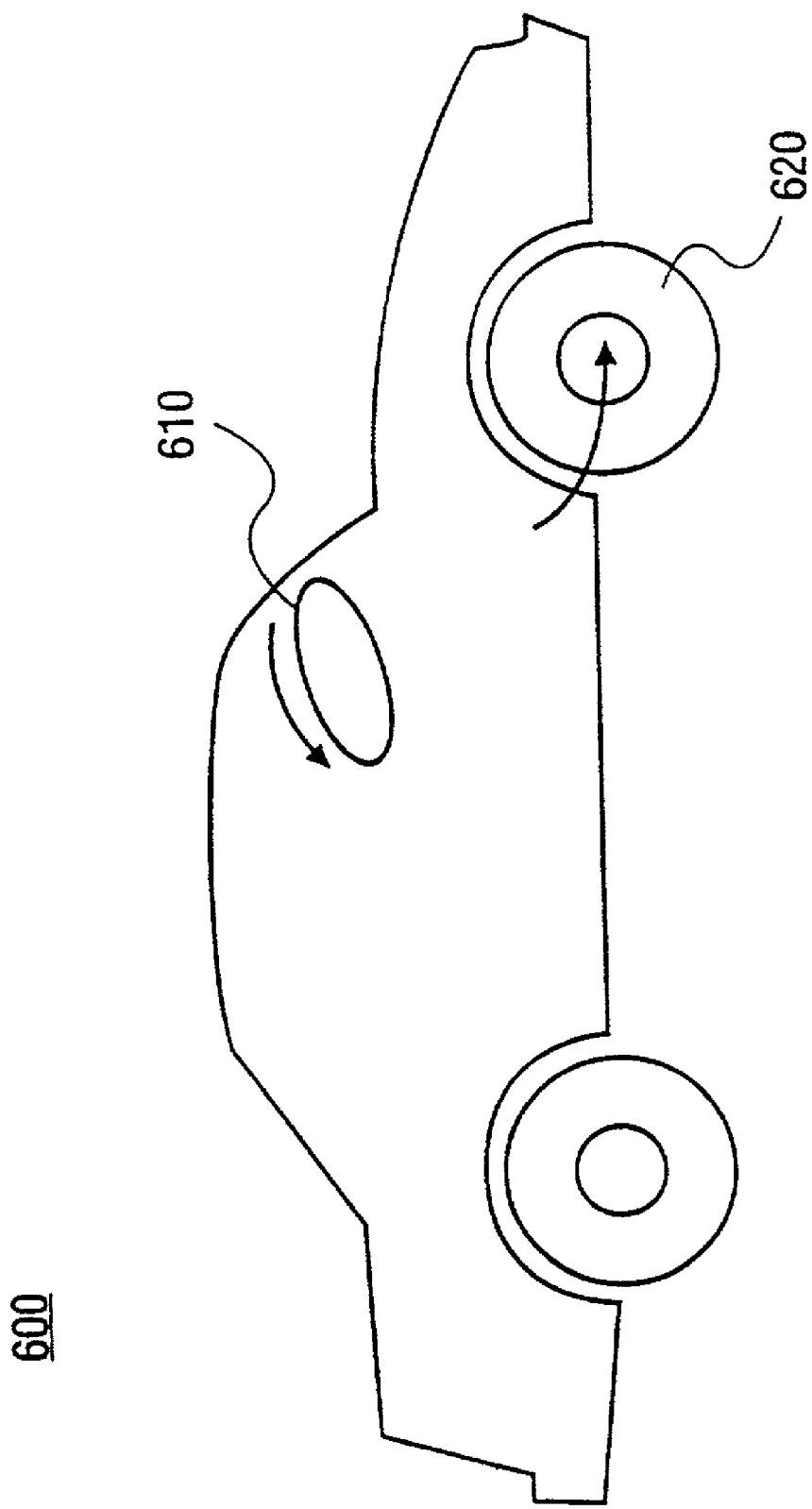
FIG. 14 depicts an articulated model of a race car which may be provided using processes executed in accordance with an embodiment of the present invention.

FIG. 14 depicts an articulated model of a race car which may be provided using processes executed in accordance with an embodiment of the present invention. Referring to FIG. 14 there is shown a racecar 600, including steering wheel 610, and tires 620. By using additional tracking data, variations in this articulated model of the racing car may be computed. For instance, if this approach were applied to such a car during a car race, the depth map computed from a rigid model of the car would be accurate if the model and camera data were precise. Because the wheels of the car, however, move relative to the car, an articulated car model is needed. In car racing, there is real time telemetry data available on steering. Consequently, the 3D model could be adjusted to properly orient the wheels based on the steering data to provide a more accurate model for rendering the depth map.

Figure 15:
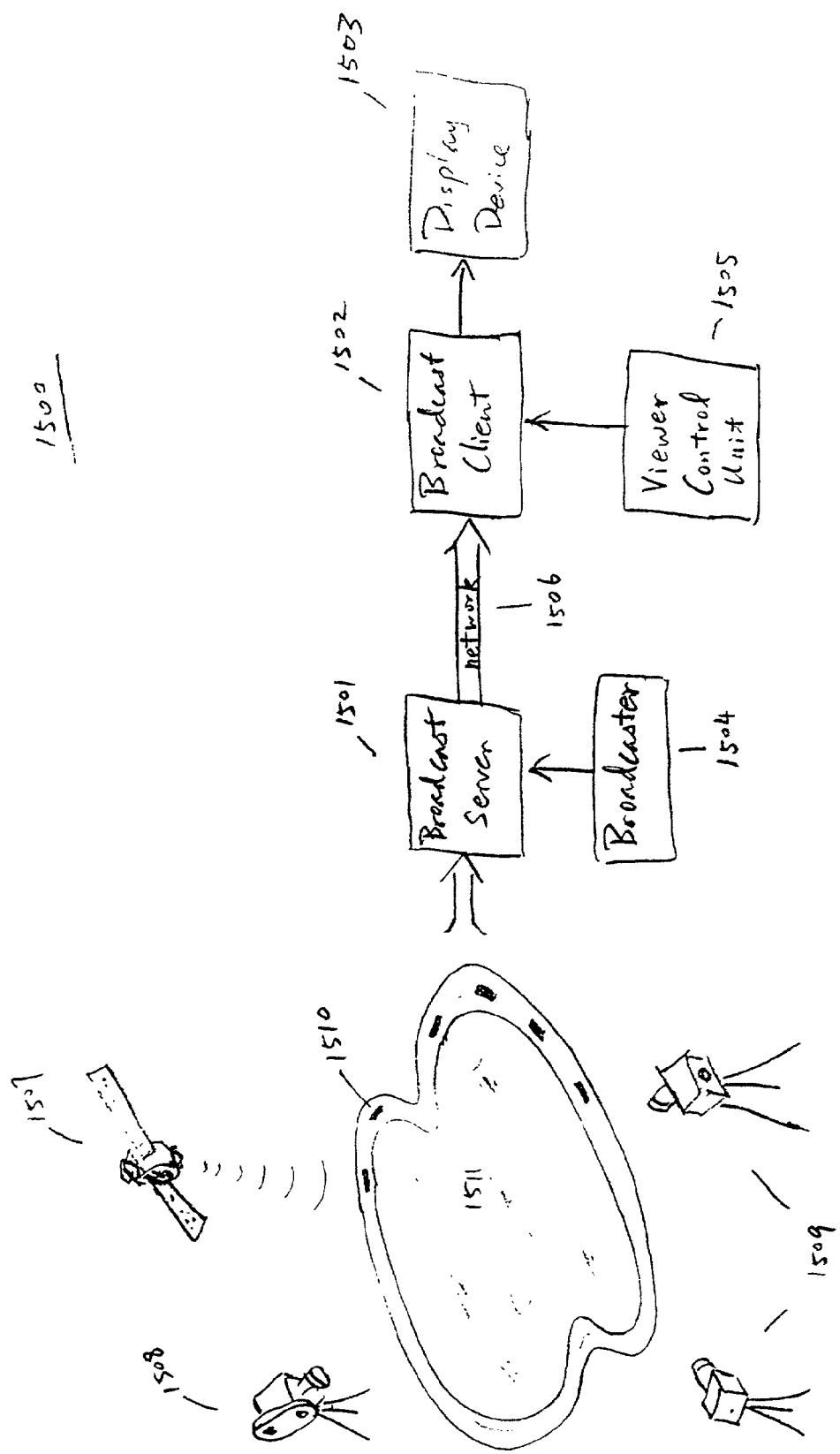
FIG. 15 depicts yet an alternative embodiment of the present invention.

FIG. 15 illustrates an exemplary system for enhancing live sport broadcast according to one embodiment of the present invention. The system 1500 includes a live sport environment 1511, a broadcast server 1501 which may be controlled by a broadcaster 1504, a broadcast client 1502 communicating with the broadcast server 1501 over a network 1506, a viewer control unit 1505 coupled to the broadcast client 1502, and a display device 1503 to display the broadcast images. The live broadcast environment 1511 includes a live video camera 1508 to provide live audio visual (A/V) data, a GPS satellite 1507 to provide position and the orientation information of an interested object, such as racing car 1510, and tracked cameras 1509 to provide tracked camera data.

Referring to FIG. 15, the broadcast server 1501 receives live A/V data from a live video camera 1508 and other supplemental data. In one embodiment, the supplemental data includes tracked camera data from multiple tracked cameras, such as cameras 1509. The tracked camera data includes the position of the camera tracked. In an alternative embodiment, the supplemental data includes position and orientation data of an interested object (e.g., racing car 1510) from a GPS satellite 1507. In a further alternative embodiment, a plurality of sensors may be placed in strategic points of the racing car 1510, such as steering 610 or wheel 620 illustrated in FIG. 14 to enhance the realistic movement of the car in a 3D space. Other tracking or acquisition devices may be utilized.

The supplemental data collected from the GPS satellite 1507, tracked cameras 1509, live video camera 1508, and sensing data from a plurality of sensors placed in the car 1510, is received at the broadcast server 1501. In one embodiment, a broadcaster may further edit the data. Alternatively, the supplemental data may be encoded in a transported package. In one embodiment, the supplemental data may be encoded in a format compatible with motion picture expert group (MPEG), such as MPEG2. The supplemental data is then transmitted to the broadcast client 1502 over a network. In one embodiment, the network may be an Internet. Alternatively, the network may be a cable, satellite, or terrestrial broadcast network. The supplemental data may be decode to retrieve original supplemental data.

The broadcast client then may generate a synthetic scene, or synthetic camera view based on the supplemental data received above. In one embodiment, a user may select a specific view to be constructed through the viewer control unit 1505. During the processing of the data, a depth map for storing the depth information of the synthetic view may be construed using a method discussed above. Then the synthetic scene specified by a user may be combined with the live broadcast video, using the depth map. The combined video is then displayed at the display device 1503.

It will be appreciated that that more or fewer processes may be incorporated into the methods illustrated in FIGS. 11A–B, 12 and 13 without departing from the scope of the invention and that no particular order is implied by the arrangement of blocks shown and described herein. It further will be appreciated that the processes described in conjunction with FIGS. 11A–B, 12 and 13 may be embodied in machine-executable instructions, e.g. software. The instructions can be used to cause a general-purpose or special-purpose processor that is programmed with the instructions to perform the operations described. Alternatively, the operations might be performed by specific hardware components that contain hardwired logic for performing the operations, or by any combination of programmed computer components and custom hardware components. The methods may be provided as a computer program product that may include a machine-readable medium having stored thereon instructions which may be used to program a computer (or other electronic devices) to perform the methods. For the purposes of this specification, the terms "machine-readable medium" shall be taken to include any medium that is capable of storing or encoding a sequence of instructions for execution by the machine and that cause the machine to perform any one of the methodologies of the present invention. The term "machine-readable medium" shall accordingly be taken to included, but not be limited to, solid-state memories, optical and magnetic disks, and carrier wave signals. Furthermore, it is common in the art to speak of software, in one form or another (e.g., program, procedure, process, application, module, logic . . . ), as taking an action or causing a result. Such expressions are merely a shorthand way of saying that execution of the software by a computer causes the processor of the computer to perform an action or a produce a result.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method for enhancing a broadcast of an event, comprising:

generating a synthetic scene based on audio visual data and supplemental data received in the broadcast;

generating a depth map to store depth information for the synthetic scene; and integrating the synthetic scene into the broadcast using the depth map, wherein generating the depth map comprises:

establishing the virtual camera using camera tracking data of a tracked camera which defines a viewpoint for the synthetic scene;

setting a field of view of the virtual camera to a corresponding field of view of the tracked camera;

positioning a synthetic tracked object in the synthetic scene according to position information of the tracked object;

extracting depth information of the synthetic tracked object to generate the depth map; and refining the depth map by distorting grid coordinates of the depth map based on characteristics of the tracked camera.

2. The method of claim 1, wherein the supplemental data comprises sensing data from a plurality of sensors placed at strategic points to render realistic synthetic movement of a synthetic object in the synthetic scene.

3. The method of claim 1, wherein the supplemental data comprises position and orientation data of an object from a global positioning system receiver, the position and orientation data indicating the position and orientation of the object in a three dimensional space.

4. The method of claim 3, wherein the global positioning system receiver further provides environmental conditions of the event to synchronize with the broadcast.

5. The method of claim 1, wherein the supplemental data comprises camera tracking data from a tracked camera located at the event, the camera tracking data including positions of the tracked camera in a three dimensional space to generate a virtual camera corresponding to the tracked camera.

6. The method of claim 5, further comprising registering the camera tracking data with the broadcast to render a virtual version of an object in the broadcast.

7. The method of claim 1, further comprising a signal processor for processing the audio visual data and the supplemental data to generate the synthetic scene using the depth map.

8. The method of claim 7, further comprising selecting a desired synthetic camera view in response to receiving an input through a user interface.

9. The method of claim 1, further comprising repositioning the virtual camera in response to position changes of the tracked camera.

10. The method of claim 1, further comprising:
reconstructing a virtual view of a model, using the position information and camera tracking data; and
extracting the depth information from the virtual view to generate the depth map.

11. A method for enhancing a broadcast of an event, comprising:
collecting, at a broadcast server, audio visual data and supplemental data from the event;
transmitting the audio visual data and the supplemented data to a broadcast client over a network;
generating, at the broadcast client, a synthetic scene based on the audio visual data and the supplemental data;
generating a depth map to store depth information for the synthetic scene; and
integrating the synthetic scene into the broadcast using the depth map, wherein the generating the depth map comprises:
establishing the virtual camera using camera data of a tracked camera which defines a viewpoint for the synthetic scene;
setting a field of view of the virtual camera to corresponding field of view of the tracked camera;
positioning a synthetic tracked object in the synthetic scene according to position information of the tracked object;
extracting depth information of the synthetic tracked object to generate the depth map; and
refining the depth map by distorting grid coordinates of the depth map based on characteristics of the tracked camera.

12. The method of claim 11, further comprising:
encoding, at the broadcast server, the audio visual data and the supplemental data as motion picture expert group compatible data; and
decoding, at the broadcast client, the motion picture expert group compatible data to retrieve the audio visual data and supplemental data.

13. The method of claim 11, wherein the supplemental data comprises:
sensing data from a plurality of sensors placed at the strategic points of the event;
position and orientation data from a global positioning system receiver; and
camera tracking data from a tracked camera.

14. The method of claim 11, further comprising selecting a desired synthetic camera view in response to receiving an input at the broadcast client.

15. A system for enhancing a broadcast of an event, comprising:
a video signal unit coupled to provide audio visual data from the event;
a supplemental data unit coupled to provide supplemental data from the event;
a depth map coupled to provide depth information; and
a processing unit configured to process the audio visual data and the supplemental data to generate a synthetic scene and further, the processing unit configured to integrate the synthetic scene into the broadcast using the depth map, wherein generating the depth map comprises:
establishing the virtual camera using camera data of a tracked camera which defines a viewpoint for the synthetic scene;
setting a field of view of the virtual camera to corresponding field of view of the tracked camera;
positioning a synthetic tracked object in the synthetic scene according to position information of the tracked object;
extracting depth information of the synthetic tracked object to generate the depth map; and
refining the depth map by distorting grid coordinates of the depth map based on characteristics of the tracked camera.

16. The system of claim 15, further comprising a viewer control unit to receive a user selection of the synthetic scene.

17. The system of claim 15, further comprising:
a plurality of sensors placed at strategic points of a synthetic object to provide sensing data to render realistic synthetic movement of the synthetic object in the synthetic scene;
a global positioning system receiver to provide position and orientation data of the synthetic object, the position and orientation data indicating the position and orientation of the synthetic object in a three dimensional space; and
a tracked camera located at the event to provide camera track data, the camera track data including positions of the tracked camera in a three dimensional space to generate a virtual camera corresponding to the tracked camera.

18. A system for enhancing a broadcast of an event, comprising:
a broadcast server configured to receive audio visual (A/V) data and supplemental data; and
a broadcast client configured to receive the audio visual data and the supplemental data transmitted from the broadcast server over a network, the broadcast client communicating with the broadcast server over the network,
wherein the broadcast client:
generates a synthetic scene based on the audio visual data and the supplemental data;
generates a depth map to store depth information for the synthetic scene, wherein generating the depth map comprises:
establishing the virtual camera using camera data of a tracked camera which defines a viewpoint for the synthetic scene;
setting a field of view of the virtual camera to corresponding field of view of the tracked camera;
positioning a synthetic tracked object in the synthetic scene according to position information of the tracked object; and
extracting depth information of the synthetic tracked object to generate the depth map; and
refining the depth map by distorting grid coordinates of the depth map based on characteristics of the tracked camera; and
integrates the synthetic scene into the broadcast using the depth map.

19. The system of claim 18, further comprising:
a display device coupled to the broadcast client to display the integrated broadcast; and
a viewer control unit coupled to the broadcast client to allow a user to select the synthetic scene to be displayed.

20. The system of claim 18, wherein the broadcast server encodes the audio visual data and the supplemental data to be motion picture expert group compatible data, and wherein the broadcast client decodes the motion picture expert group compatible data to retrieve the audio visual data and the supplemental data.

21. The system of claim 18, wherein the supplemental data comprises:
sensing data from a plurality of sensors placed at the strategic points of a synthetic object at the event;
position and orientation data of the synthetic object from a global positioning system receiver; and
camera tracking data from a tracked camera.

22. A machine-readable medium having executable code to cause a machine to perform a method for enhancing a broadcast of an event, the method comprising:
generating a synthetic scene based on audio visual data and supplemental data received in the broadcast;
generating a depth map to store depth information for the synthetic scene; and
integrating the synthetic scene into the broadcast using the depth map, wherein generating the depth map comprises:
establishing the virtual camera tracking data of a tracked camera which defines a viewpoint for the synthetic scene;
setting a field of view of the virtual camera to a corresponding field of view of the tracked camera;
positioning a synthetic tracked object in the synthetic scene according to position information of the tracked object;
extracting depth information of the synthetic tracked object to generate the depth map; and
refining the depth map by distorting grid coordinates of the depth map based on characteristics of the tracked camera.

23. The machine-readable medium of claim 22, wherein the method further comprises selecting a desired synthetic camera view in response to receiving an input through a user interface.

24. The machine-readable medium of claim 22, wherein the method further comprises:
reconstructing a virtual view of a model, using the position information and camera tracking data; and
extracting the depth information from the virtual view to generate the depth map.

25. A machine-readable medium having executable code to cause a machine to perform a method for enhancing a broadcast of an event, the method comprising:
collecting, at a broadcast server, audio visual data and supplemental data from the event;
transmitting the audio visual data and the supplemented data to a broadcast client over a network;
generating, at the broadcast client, a synthetic scene based on the audio visual data and the supplemental data;
generating a depth map to store depth information for the synthetic scene; and
integrating the synthetic scene into the broadcast using the depth map, wherein the generating the depth map comprises:
establishing the virtual camera using camera data of a tracked camera which defines a viewpoint for the synthetic scene;
setting a field of view of the virtual camera to corresponding field of view of the tracked camera;
positioning a synthetic tracked object in the synthetic scene according to position information of the tracked object;
extracting depth information of the synthetic tracked object to generate the depth map; and
refining the depth map by distorting grid coordinates of the depth map based on characteristics of the tracked camera.

26. The machine-readable medium of claim 25, wherein the method further comprises:
encoding, at the broadcast server, the audio visual data and the supplemental data as motion picture expert group compatible data; and
decoding, at the broadcast client, the motion picture expert group compatible data to retrieve the audio visual data and supplemental data.

27. The machine-readable medium of claim 25, wherein the supplemental data comprises:
sensing data from a plurality of sensors placed at the strategic points of the event;
position and orientation data from a global positioning system receiver; and
camera tracking data from a tracked camera.

28. The machine-readable medium of claim 25, wherein the method further comprises selecting a desired synthetic camera view in response to receiving an input at the broadcast client.

* * * * *